United States Patent [19]
Vu

[11] Patent Number: 5,838,122
[45] Date of Patent: Nov. 17, 1998

[54] MOTOR INITIALIZATION METHOD AND APPARATUS

[75] Inventor: Hung D. Vu, Pembroke, Mass.

[73] Assignee: Seiberco Incorporated, Braintree, Mass.

[21] Appl. No.: 582,080

[22] Filed: Feb. 8, 1996

[51] Int. Cl.⁶ ...................................................... H02P 5/40
[52] U.S. Cl. ............................................ 318/254; 318/439
[58] Field of Search .................................... 318/254, 439, 318/138, 705–707, 716, 717, 718

[56] References Cited

U.S. PATENT DOCUMENTS

| | | | |
|---|---|---|---|
| 4,678,973 | 7/1987 | Elliott et al. | 318/254 |
| 4,687,961 | 8/1987 | Horber . | |
| 4,703,235 | 10/1987 | Wisner | 318/254 |
| 4,876,491 | 10/1989 | Squires et al. | 318/138 |
| 4,992,710 | 2/1991 | Cassat . | |
| 5,001,405 | 3/1991 | Cassat . | |
| 5,028,852 | 7/1991 | Dunfield . | |
| 5,254,914 | 10/1993 | Dunfield et al. . | |
| 5,329,195 | 7/1994 | Horber et al. . | |
| 5,378,976 | 1/1995 | Inaji et al. | 318/810 |
| 5,525,886 | 6/1996 | Lyons et al. | 318/701 |
| 5,537,020 | 7/1996 | Couture et al. | 318/720 |
| 5,569,990 | 10/1996 | Dunfield | 318/254 |
| 5,598,071 | 1/1997 | Dunfield et al. | 318/254 |
| 5,633,569 | 5/1997 | Chloupek et al. | 318/430 |

FOREIGN PATENT DOCUMENTS 0251785   1/1987   European Pat. Off. .

*Primary Examiner*—Brian Sircus
*Attorney, Agent, or Firm*—Ira S. Dorman

[57] ABSTRACT

Phase alignment and initialization of a polyphase brushless DC motor are achieved, at standstill, by noting amplitude changes in signals from integral feedback coils while phase coils of the motor, magnetically coupled to the sensor coils, are energized at non-torque producing commutation angles.

6 Claims, 7 Drawing Sheets

MOTOR INITIALIZATION METHOD AND APPARATUS

BACKGROUND OF THE INVENTION

The present invention relates to polyphase brushless DC motors having integrated position-sensing coils, of the kind described and claimed in Horber U.S. Pat. No. 4,687,961 and Horber et al U.S. Pat. No. 5,329,195, both of which are of common assignment herewith.

The motors of the above-identified Horber and Horber et al patents are characterized in having two rotor feedback cycles associated with each motor phase cycle. The feedback signal can therefore be aligned either to the positive half or the negative half of the same motor phase cycle sine wave, and determination of this relationship at start-up is imperative to enable commutation of the motor in the correct direction for operation. If phase alignment is not correctly determined on start-up the motor will run of course in the wrong direction, potentially leading to a catastrophic failure of the system.

Phase alignment of the instant motors has heretofor been achieved by applying a linear ramp current to the motor phase commutation of fixed +90° electrical from the initially acquired feedback position. Upon rotation of the rotor under the applied torque power (at least 2° of mechanical motion of the rotor is necessary), consecutive feedback positions were sampled to determine their relationship to one another, and to thereby achieve phase alignment. In many circumstances, however, any movement whatsoever of the motor shaft on start-up is undesirable or, indeed, intolerable or impossible.

The prior has provided procedures for motor initialization without movement of the shaft, as described for example in Cassat U.S. Pat. Nos. 4,992,710 and 5,001,405, Dunfield U.S. Pat. No. 5,028,852, Dunfield et al U.S. Pat. No. 5,254,914, and Squires et al European patent Application 0 251 785. The techniques of these patents are specific to the motor constructions described therein, and could not function effectively with the integrated sensor coils that characterize the motor of the instant invention. Moreover, although the prior art methods are no doubt effective to enable commutation of those particular motors in the selected direction, they cannot provide the dynamic, high-resolution position detection capability that is afforded by the instant motor and method.

SUMMARY OF THE INVENTION

Accordingly, the primary objects of the present invention are to provide a novel method for phase alignment and initialization of a polyphase, brushless DC motor having integrated position sensing coils, and to provide a novel motor of such character having such phase alignment and initialization capability.

Related objects of the invention are to provide such a method and motor having the foregoing features and advantages, which are in addition highly effective and reliable in operation and performance, and are relatively facile to design and implement.

It has now been found that certain of the foregoing and related objects of the invention are readily obtained by the provision of a polyphase direct current electric motor that includes control means of unique construction. The motor comprises a stator of magnetic material having an array of mutually spaced pole elements thereon, a plurality of phase coils wound separately from one another on at least certain elements, and a plurality of sensor coils so wound; in some embodiments, a phase coil and a sensor coil may be wound on the same pole element. First connecting means interconnects the phase coils, to enable at least two motor phases, and second connecting means interconnects the sensor coils to enable at least two sensor circuits, each sensor coil being magnetically coupled through the stator to at least one phase coil. The motor also includes an armature having an array of mutually spaced pole elements thereon, which can be at least temporarily magnetized so as to afford positive and negative polarities to poles in alternating positions in the array. The armature is mounted for movement relative to the stator with its pole elements moving in physical and magnetic proximity past the stator pole elements. At least one power supply is electrically connected to the "first" and "second" connecting means of the motor stator, for providing direct current thereto, and the control means is operatively connected to the at least one power supply and the second connecting means for controlling the electrical current supplied to at least the first connecting means; normally, current will be supplied constantly to the second connecting means from a separate power supply comprising a fixed-frequency circuit. The control means is constructed to carry out the following steps:

(a) effecting the delivery of electrical current from the at least one power supply for excitation of the feedback coils so as to produce feedback signals from the two sensor circuits indicative of the position of the armature;

(b) detecting the feedback signals;

(c) utilizing the detected feedback signals to determine the position of the armature;

(d) effecting the delivery of electrical current from the at least one power supply for excitation of the phase coils at such a commutation angle as to maintain the motor in torque equilibrium and the armature in fixed position;

(e) determining changes in the feedback signals during the phase coil excitation step; and (f) utilizing the determined feedback signal changes to determine the actual value of the commutation angle.

In most instances, the control means will be constructed to carry out, as further steps:

(g) utilizing the determined actual value of the commutation angle to determine the phase polarity of the motor; and (h) utilizing the determined motor phase polarity for controlling the delivery of electrical current from the at least one power supply for excitation of the phase coils at such a commutation angle as to effect movement of the armature in a selected direction. The commutation angle of step (h) will normally differ by 90° from the commutation angle of said step (d).

Other objects of the invention are attained by the provision of a method for phase alignment of a polyphase direct current electric motor of the character described, at start-up and without movement of its armature. In carrying out the method, the steps recited above, performed by the control means, will be effected.

DETAILED DESCRIPTION OF THE PREFERRED AND ILLUSTRATED EMBODIMENTS

Figure 1:
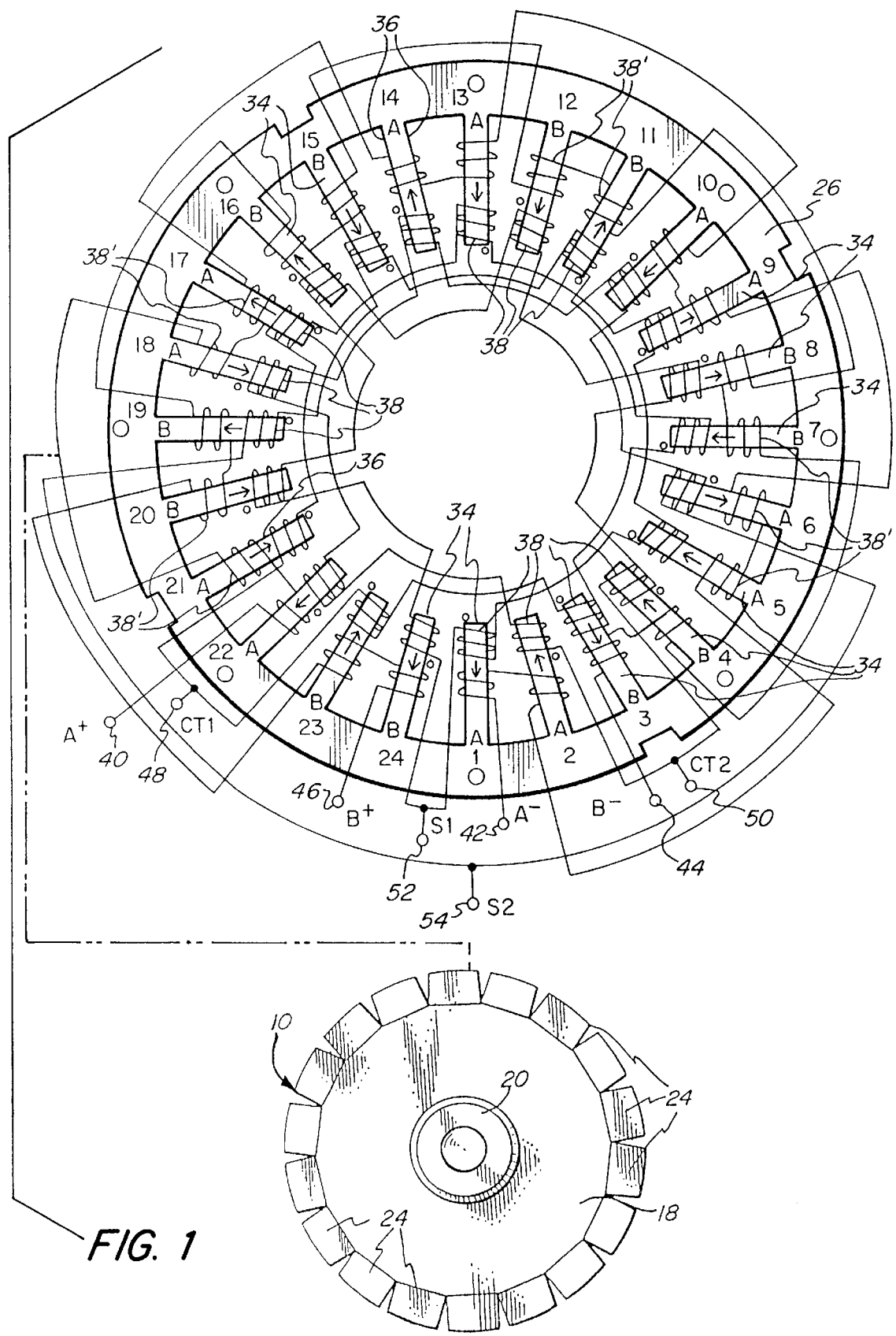
FIG. 1 is an exploded, end view of the stator and rotor of a motor embodying the present invention, with the wiring of the stator being schematically illustrated.

Turning initially to FIG. 1 of the appended drawings, therein illustrated are the components of a polyphase DC motor of the kind to which the phase alignment and initialization routine of the present invention are applied. The motor is more fully described in the above-identified Horber et al U.S. Pat. No. 5,329,195, and accordingly only limited description of its features is required.

The rotor, generally designated by the numeral 10, consists of a cylindrical core 18 with oppositely extending axial shaft portions 20 (only one of which is visible) and an array of high energy permanent magnets 24 secured (such as by adhesive bonding) on the surface thereof and extending longitudinally (axially) therealong; the magnets are disposed with their polarities alternating in the array, and will advantageously be made of a samarium/cobalt alloy.

The stator, generally designated by the numeral 12, is comprised of numerous axially stacked laminae (only one of which is visible) of punched or stamped steel fabrication, each consisting of an annular body element 26, with 24 pole elements 34 extending radially inwardly therefrom at equidistantly spaced locations about its inner circumference. As will be appreciated, the stacked laminae cooperatively provide the poles 34 of the stator (for convenience, the parts of the stator and the elements of the laminae from which they are formed are given the same numbers).

Each pole 34 of the stator 12 has two coils 38, 38' disposed adjacently thereupon and insulated therefrom with paper or a synthetic resinous material, in a conventional manner. The coils 38, 38' are wound and interconnected, as shown. More particularly, there are two sensor circuit legs, designated CT1 and CT2, which are electrically parallel to one another and join at the junctions designated S1 and S2. All coils 38 of the set comprising the circuit leg CT1 are wound in one direction upon the odd-numbered stator poles 34, and all of the coils 38 comprising the circuit leg CT2 are wound in the opposite direction upon the even-numbered poles. Thus, the sensor coils of the two sets produce oppositely directed magnetic fluxes, as indicated by the positions of the small circles adjacent either the outer or the inner end of the coil winding.

The junctions at which the terminals 48 and 50, for CT1 and CT2 sensor circuit legs, respectively, are connected effectively subdivide each set of sensor coils 38 into two, equal-number subsets. In addition to having the poles of each sensor coil set alternatingly interposed with one another, it can be seen that the poles of each coil subset also alternate with one another about the stator body.

With regard to the phase, or torque coils 38', those wound on the poles numbered 1, 2, 5, 6, 9, 10, 13, 14, 17, 18, 21 and 22 are connected in series as a first phase, designated "A", and those wound on the remaining poles are interconnected as a second phase, designated "B". Thus, the poles of each phase group are arranged as adjacent pairs, and the phase coils 38' on the paired poles are wound in opposite directions so as to cause the magnetic flux to follow a path through the pairs of poles when the phase is energized, thus magnetically coupling them.

It will be appreciated from the foregoing that the wiring of the stator described adapts each pole to function as a torque pole and a sensor pole. The particular arrangement illustrated affords optimal magnetic balance in both the power and the sensing functions of the motor, when the stator is connected to operate on two phases of equal voltage and to provide two-channel feedback signals, in addition to affording extremely high levels of resolution of rotor position and hence exceptionally accurate position information. Nevertheless, it should again be pointed out that stators such as those of the above-identified Horber patent can desirably be employed in the practice of the present invention, as can motors of any other design and configuration that satisfy the minimal criteria herein set forth.

Figure 2:
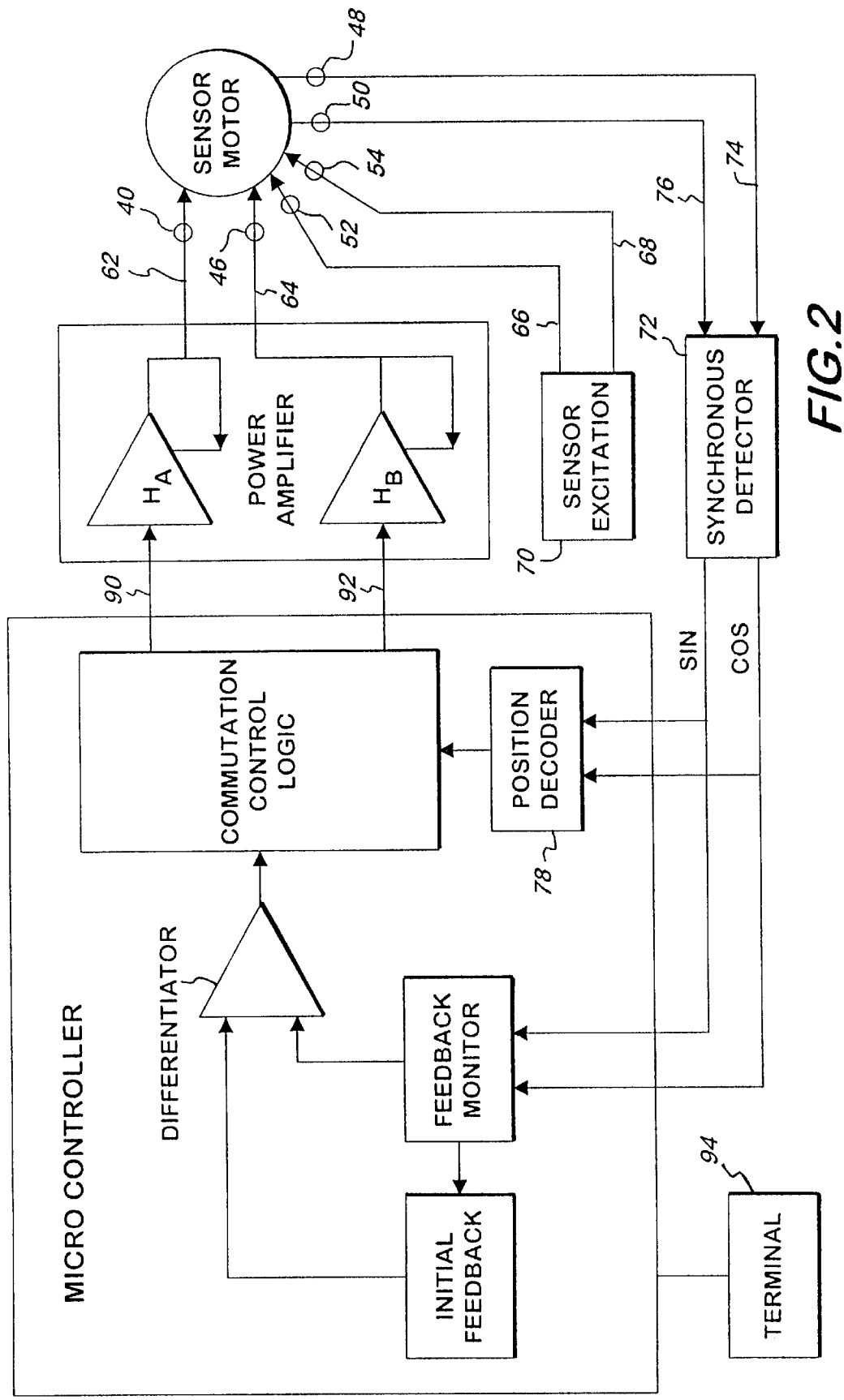
FIG. 2 is a diagrammatic representation of a motion control system embodying the present invention.

FIG. 2 constitutes a functional block diagram of a system employing the instant motor. Power for the motor "SENSOR MOTOR" 82 is provided by an amplifier 84, which operates on DC voltage and is comprised of an H-bridge for each phase, designed $H_A$ and $H_B$, connected respectively through lines 62, 64 to terminals 40, 46, and having current-regulating minor loops, as illustrated; the H-bridges will advantageously employ power field effect transistors, and will typically be operated at 20 KHz chopping frequency.

The terminals 52, 54 for the sensor channels of the motor are connected through lines 66, 68 to a DC powered sensor excitation unit 70, which may also take the form of an H-bridge and will typically operate at a predetermined constant frequency of 100 KHz to supply constantly an alternating current to the pairs of sensor coils of the two channels, CT1 and CT2, respectively. The unit 70 is synchronized with the synchronous detector 72, which is connected through lines 74, 76 to terminals 48 and 50 of the motor 82 and performs inversion functions upon the signals from the sensor channels, to provide single-level voltages of varying amplitude to a position decoder, which comprises a function of a microprocessor controller "MICRO CONTROLLER" 78 integrated into the system. The microprocessor 78, which may advantageously be an Intel 80C196 chip or the like, also includes feedback monitoring, initial feedback, signal differentiation and commutation control functions, interconnected as shown in the drawing. Signals from the microprocessor controls the H-bridges $H_A$ and $H_B$, through lines 90 and 92, for coil energization and pulse-width modulation appropriate to produce desired operation of the motor, depending upon rotor position and the command signals input into the system from a control terminal 94.

As will be appreciated, the amplitude of the voltages detected at terminals 48 and 50 will depend upon the inductance of the sensor coils 38, in turn providing an indication of magnetic flux in the poles, as affected by the rotor magnets. Fundamental to the invention however is the appreciation that flux from the energized phase coils 38' also has a meaningful affect upon inductance of the sensor coils 38, and hence upon the signals derived from them.

In the context of the present invention, once the feedback position is known commutation can be effected at either 0° or 180°, thus producing no torque on the armature. It has also been appreciated however that energization of the phase coils at such commutation angles (unlike commutation at 90°) will be reflected as proportional amplitude changes in the feedback signal, increasing or decreasing depending upon whether the feedback signal was aligned to the positive or the negative half of the motor phase sine wave. In either case, the feedback signal at standstill provides the phase alignment information necessary to correctly commutate the motor for movement in either direction selected.

Figure 3:
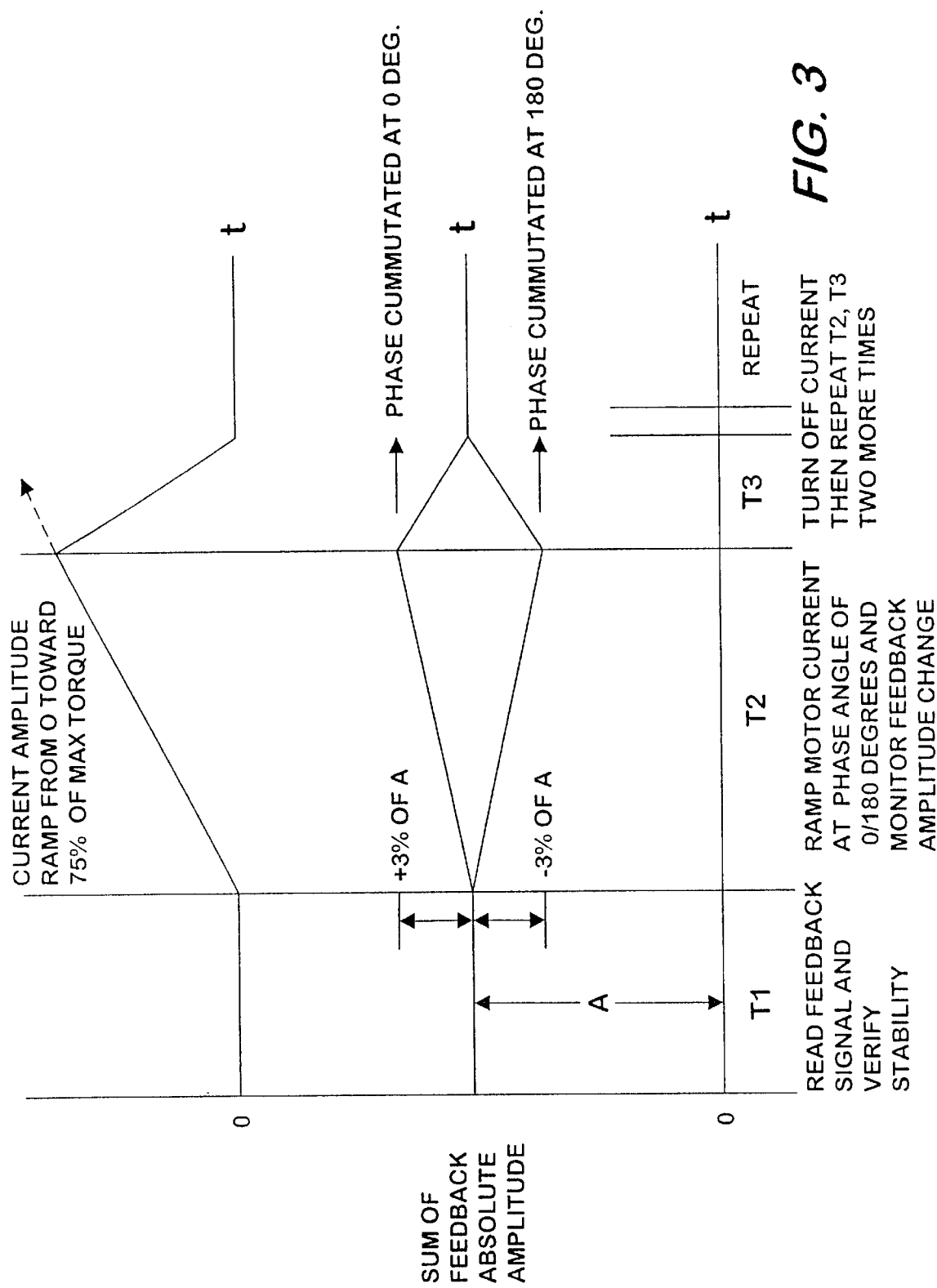
FIG. 3 is a graphic representation of applied phase current amplitudes, and feedback signal amplitude responsive thereto, during an initialization routine carried out in accordance with the invention.
Figure 4A:
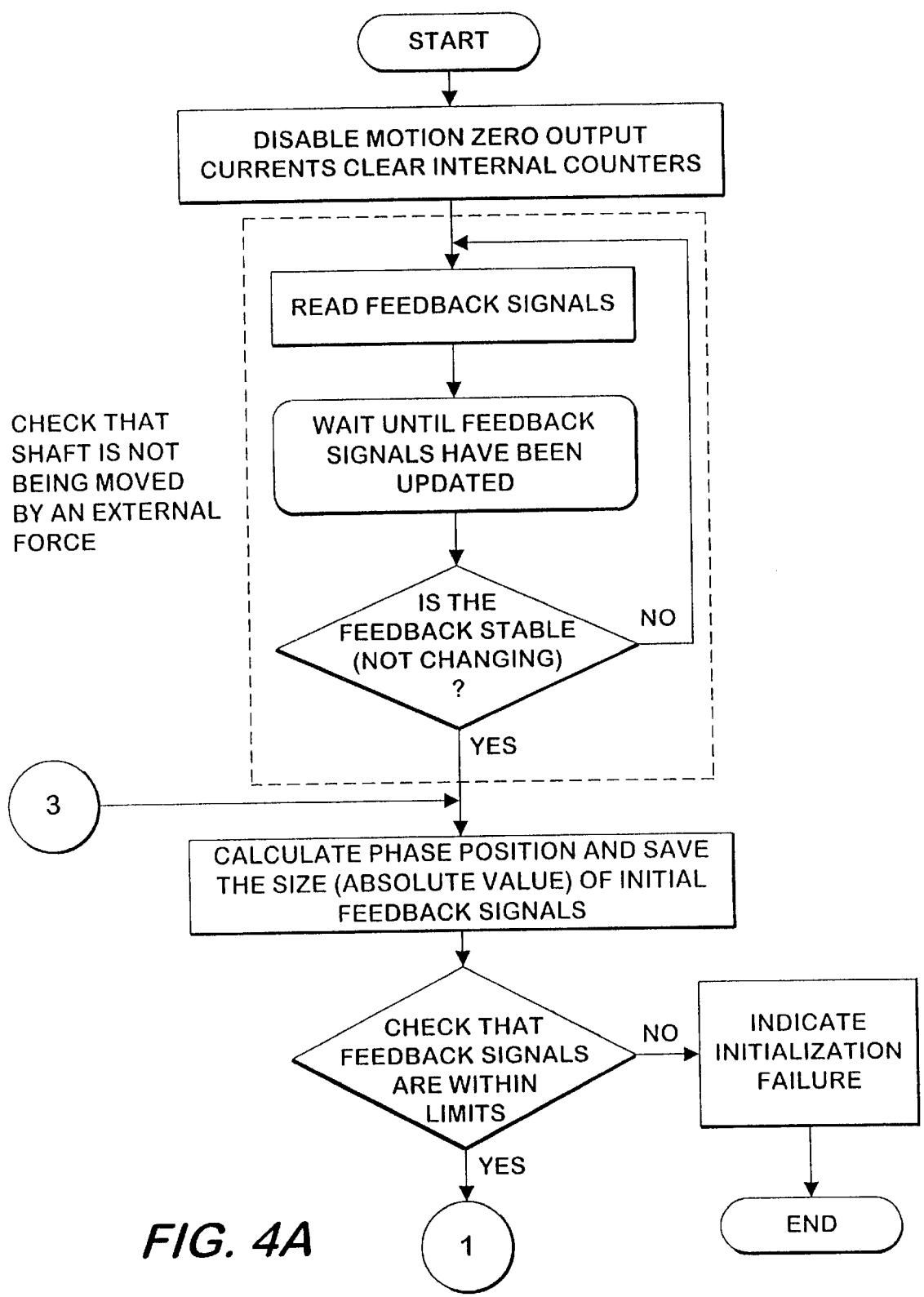
FIGS. 4A, 4B and 4C comprise a flow chart representative of the initialization routine performed in and by the method and apparatus of the invention.
Figure 4B:
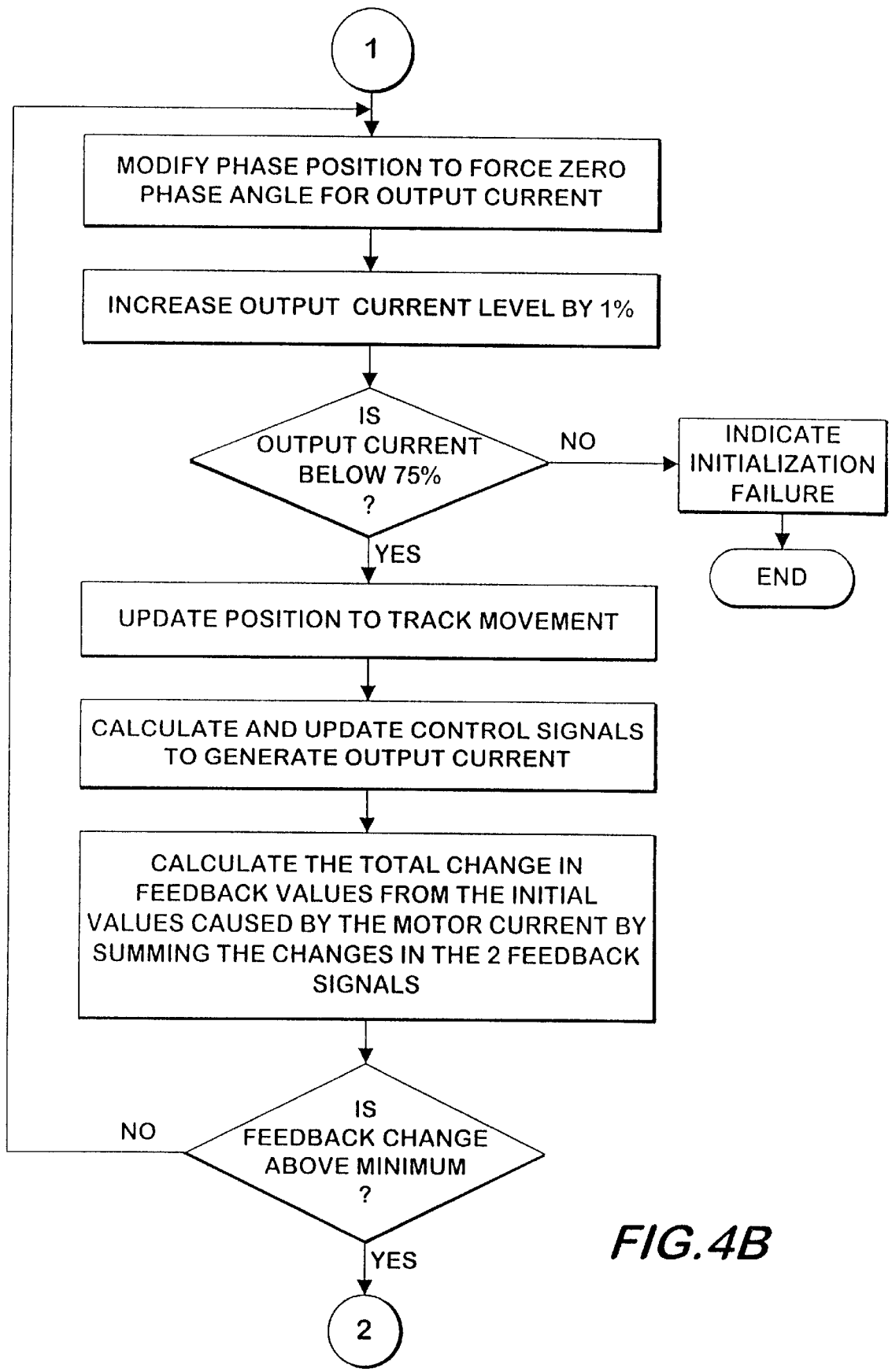
Figure 4C:
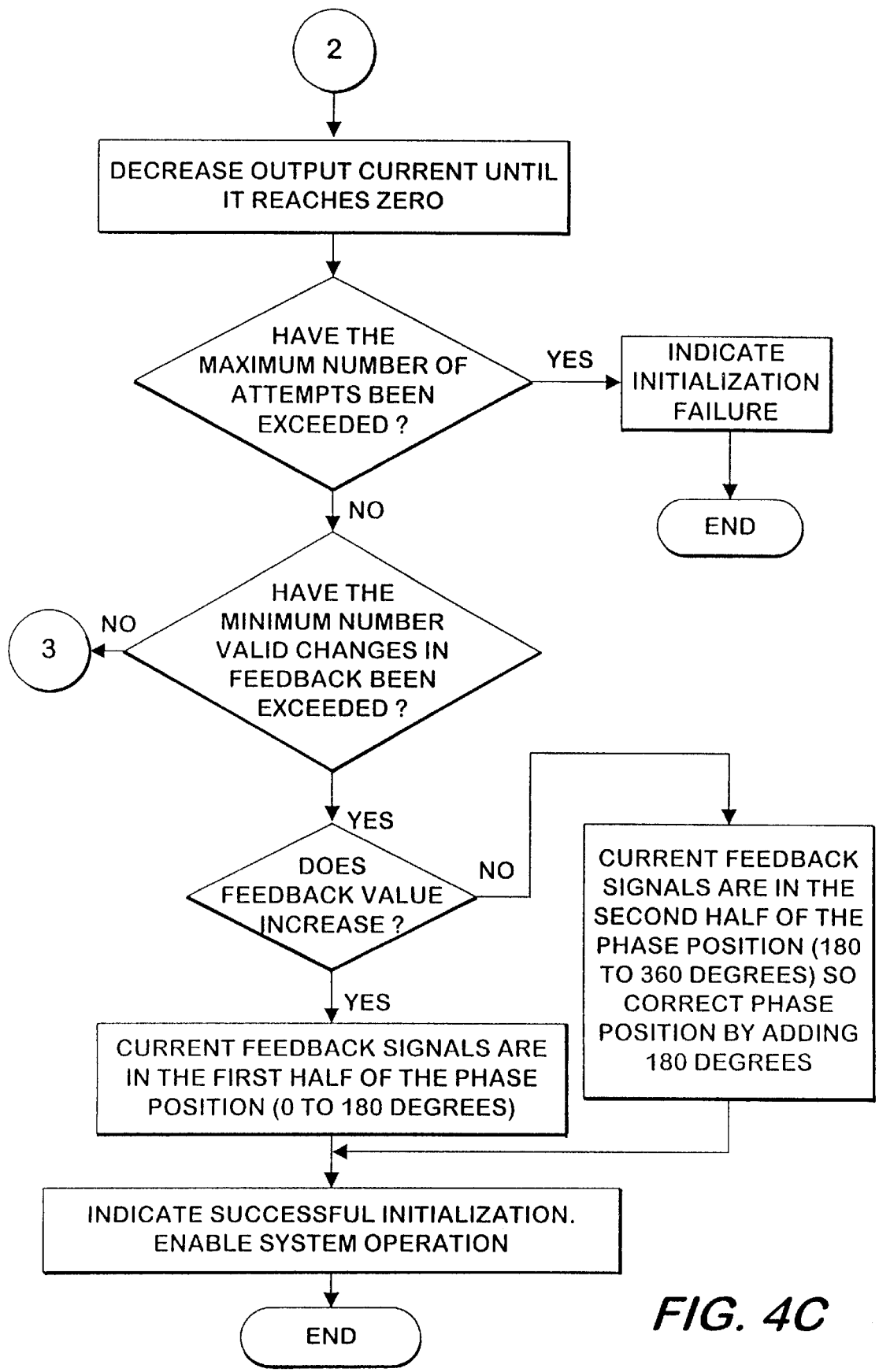
Figure 5:
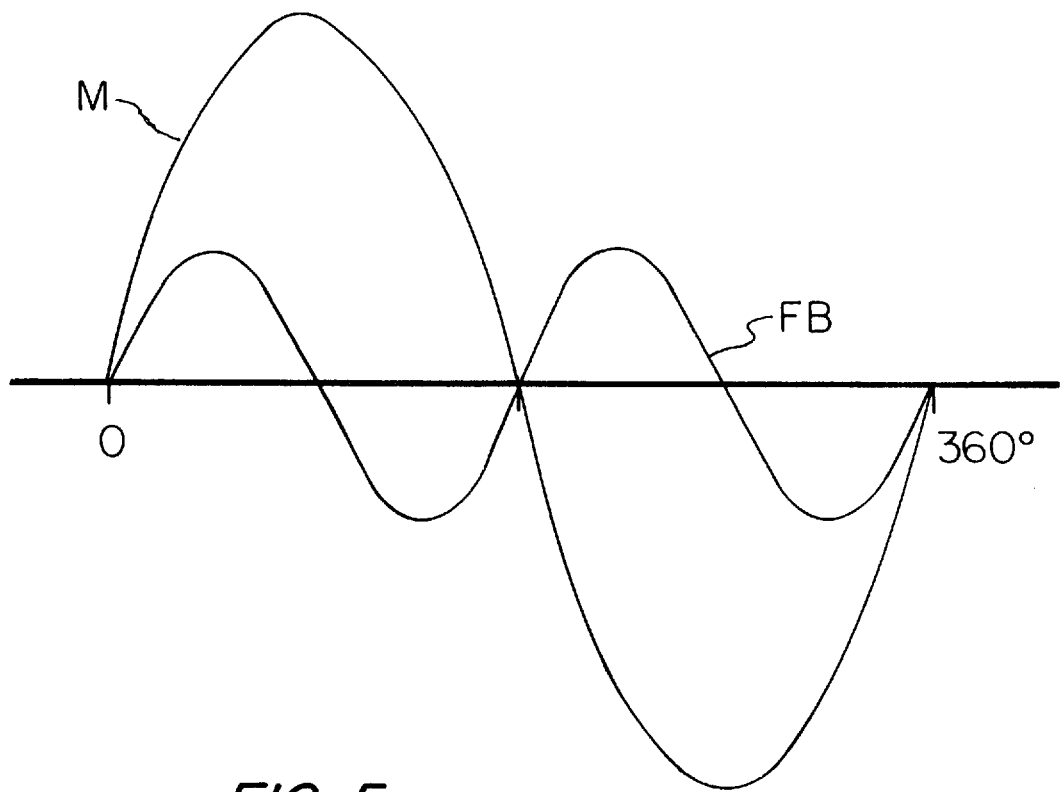
FIG. 5 is a graphic representation of the relationship between the motor phase and feedback cycle curves that are characteristic of motors embodying the invention.

These principles, and the steps carried out to implement them, are graphically illustrated in FIG. 3, FIGS. 4A–4C, and FIG. 5 of the drawings. It will be appreciated that the encircled numbers "1," "2," and "3" on FIGS. 4A–4C serve merely to indicate points of continuation of the illustrated flow chart. In FIG. 5, curve "M" represents the motor phase cycle, and curve "FB" represents the two feedback cycles, one occurring during the positive half (0° to 180°) of the motor phase cycle and the other occurring during the negative half (180° to 360°) thereof.

As can be seen with reference to FIG. 3, motor phase position and stability are determined and verified in phase "T1" by reading of the feedback signal, with the sum of the two feedback signals having an absolute amplitude "A." The sequence of steps carried out by the microprocessor 78 of FIG. 2, during phase T1, are described in FIG. 4A. Once immobility of the rotor shaft has been confirmed (i.e., that it is not being moved by externally applied forces), and it has been determined that the feedback signals are within the limits prescribed (e.g., about 20% to 80% of the maximum allowable value, and typically 1 to 4 volts), phase T2 is entered and the initialization routine is continued in accordance with the sequence set forth in FIG. 4B.

More specifically, the commutation phase angle is shifted −90° (a positive 90° shift could alternatively be applied) based upon the feedback position, producing a commutation angle of either 0°, if the feedback signal had been aligned to the positive half of the motor phase cycle sine wave shown in FIG. 5, or 180° if the feedback signal had been aligned to the negative half. The motor current is then increased from zero, ultimately to a value representative of 75% of maximum torque, at the non-torque producing angle. It will be appreciated that even under such conditions some shaft movement might occur, which is accommodated by a position-updating step.

As shown in FIG. 3, increasing feedback signal amplitudes indicate commutation at 0°, and hence alignment to the positive (0° to 180°) half of the motor phase cycle wave, whereas decreasing amplitudes indicate alignment to the negative (180° to 360°) half of the wave. The phase current is then reduced to zero, and the sequence is repeated, as appropriate to conform the information obtained. The first step referred to in FIG. 4C corresponds to phase T3 of FIG. 3, with the remaining steps comprising the successful completion of initialization and signaling a +90° commutation of the phase coils to effect movement of the motor in the correction direction. References in FIG. 3 to 3% magnitude changes are somewhat arbitrary, albeit that a 1% change may represent a practical threshold for meaningful information in most cases.

It will be appreciated that the flow chart of FIGS. 4A–4C is merely exemplary, and is regarded to represent the best mode for carrying out the invention. For example, the sequence enclosed within the dotted line rectangle of FIG. 4A will not be necessary in many instances, such as where assurance against shaft movement can be obtained by other means, and phase position modification (tantamount to commutation) can occur elsewhere in the sequence, e.g., following a position updating step. The 1% current level output increase, and the 75% upper limit upon output current, referred to in FIG. 4B, are somewhat arbitrary and may be modified as appropriate. Summing of both feedback signals, to calculate the total change in feedback values, will not generally be essential, and repetition of the cycle is advisable but not required in all instances.

Although a two-phase system has been illustrated and described, it will be understood that the concepts of the invention are equally applicable to other polyphase systems; specific modifications will of course have to be made, as will be apparent to those skilled in the art, and it is of course possible to control power independently in each phase provided. It will also be appreciated that the concepts herein described and defined are applicable to linear as well as rotary motors and motion control systems, and that the technique can be employed for purposes other than motor initialization, e.g., for continuously determining motor positions. Other modifications can of course also be made to the apparatus and method of the invention without departure from the scope of the appended claims, as will be evident to those of ordinary skill in the art.

Thus, it can be seen that the present invention provides a novel method for phase alignment and initialization of a polyphase, brushless DC motor having integrated sensing coils, and a novel motor of such character having such capabilities. The method and motor of the invention are highly effective and reliable in operation and performance, and are relatively facile to design and implement.

Having thus described the invention, what is claimed is:

1. A polyphase direct current electric motor or the like, comprising: a stator of magnetic material having an array of mutually spaced pole elements thereon, a plurality of phase coils wound separately from one another on at least certain of said pole elements, and a plurality of sensor coils wound separately from one another on at least certain of said pole elements, first connecting means interconnecting said phase coils to enable at least two motor phases, and second connecting means interconnecting said sensor coils to enable at least two sensor circuits, each of said sensor coils being magnetically coupled through said stator to at least one of said phase coils; an armature having an array of mutually spaced pole elements thereon that are at least temporarily magnetizable so as to afford positive and negative polarities to poles in alternating positions in said array, said armature being mounted for movement relative to said stator with said pole elements of said armature moving in physical and magnetic proximity past said stator pole elements; at least one power supply electrically connected to said first and second connecting means for providing direct current thereto; and control means operatively connected to said at least one power supply and said second connecting means for controlling the electrical current supplied by said at least one power supply to at least said first connecting means, said control means being constructed to carry out the following steps:

(a) effecting the delivery of electrical current from said at least one power supply for excitation of said feedback coils so as to produce feedback signals from said two sensor circuits indicative of the position of said armature;

(b) detecting said feedback signals;

(c) utilizing said detected feedback signals to determine the position of said armature;

(d) effecting the delivery of electrical current from said at least one power supply for excitation of said phase coils at such a commutation angle as to maintain said motor in torque equilibrium and said armature substantially fixed in said position;

(e) determining changes in said feedback signals during said phase coil excitation step (d); and (f) utilizing said determined feedback signal changes to determine the actual value of said commutation angle.

2. The motor of claim 1 wherein said control means is constructed to carry out, as further steps:

(g) utilizing said determined actual value of said commutation angle to determine the phase polarity of said motor; and (h) utilizing said determined motor phase polarity for controlling the delivery of electrical current from said at least one power supply for excitation of said phase coils at such a commutation angle as to effect movement of said armature in a selected direction.

3. The motor of claim 2 wherein said commutation angle of said step (h) differs by 90° from said commutation angle of said step (d).

4. A method for phase alignment of a polyphase direct current electric motor at start-up and without movement of its armature, the motor including a stator of magnetic material having an array of mutually spaced pole elements thereon, a plurality of phase coils wound separately from one another on at least certain of the stator pole elements, as at least two motor phases, and a plurality of sensor coils wound separately from one another on at least certain of the stator elements, as at least two sensor circuits, each of the sensor coils being magnetically coupled through the stator to at least one of the phase coils; and an armature having an array of mutually spaced pole elements thereon that are at least temporarily magnetizable so as to afford positive and negative polarities to poles in alternating positions in the array, the armature being mounted for movement relative to the stator with the pole elements of the armature moving in physical and magnetic proximity past the stator pole elements; said method comprising:

(a) effecting the delivery of electrical current for excitation of the feedback coils of the motor so as to produce, from the two sensor circuits, feedback signals that are indicative of the position of the armature at start-up;

(b) detecting said feedback signals;

(c) utilizing said detected feedback signals to determine the start-up position of the armature;

(d) effecting the delivery of electrical current for excitation of the motor phase coils at such a commutation angle as to maintain the motor in torque equilibrium and the armature substantially fixed in its start-up position;

(e) determining changes in said feedback signals during said phase coil excitation step (d); and (f) utilizing said determined feedback signal changes to determine the actual value of said commutation angle.

5. The method of claim 4 including, as further steps:

(g) utilizing said determined actual value of said commutation angle to determine the phase polarity of the motor; and (h) utilizing said determined motor phase polarity for controlling the delivery of electrical current for excitation of the phase coils at such a commutation angle as to effect movement of the armature in a selected direction.

6. The method of claim 5 wherein said commutation angle of said step (h) differs by 90° from said commutation angle of said step (d).

* * * * *